United States Patent [19]

Henschel, Jr.

[11] 4,277,336
[45] Jul. 7, 1981

[54] MULTIPLE BY-PASS FILTER SYSTEM

[76] Inventor: Arthur O. Henschel, Jr., 1031 Roosevelt, National City, Calif. 92050

[21] Appl. No.: 111,332

[22] Filed: Jan. 11, 1980

Related U.S. Application Data

[63] Continuation of Ser. No. 921,819, Jul. 17, 1978, abandoned.

[51] Int. Cl.³ .................. B01D 27/04; B01D 37/02
[52] U.S. Cl. .................................. 210/167; 210/193; 210/196; 210/335; 210/416.1
[58] Field of Search .................. 210/167, 195.1, 196, 210/203, 282, 323 T, 335, 416 R, 493 R, 497 R

[56] References Cited

U.S. PATENT DOCUMENTS

| | | | |
|---|---|---|---|
| 1,751,613 | 3/1930 | Baylis | 210/335 X |
| 2,757,803 | 8/1956 | Robinson et al. | 210/335 X |
| 3,203,754 | 8/1965 | Young et al. | 210/167 X |
| 3,291,562 | 12/1966 | Anderson | 210/167 X |
| 3,429,148 | 2/1969 | Worthington | 210/167 X |
| 3,503,878 | 3/1970 | Durr | 210/167 X |
| 3,561,602 | 2/1971 | Molitor | 210/335 X |
| 3,804,257 | 4/1974 | Sommermeyer | 210/335 |

Primary Examiner—Robert H. Spitzer
Attorney, Agent, or Firm—Brown & Martin

[57] ABSTRACT

A filter system for filtering cleaning solvents includes a first filter unit having mechanical filters such as paper or the like, through which the fluid is first pumped, and a second filter unit having adsorption chemicals, such as clays and charcoal, through which at least a portion of the fluid from the outlet of the first filter unit is passed and the outlet of the second filter unit is in communication with the inlet to the first filter unit for recirculating the fluid therefrom back through the first filter to filter and deposit carbon and clay particles from the second unit on the surface of the first filter unit thereby providing a multi-pass filter system.

5 Claims, 6 Drawing Figures

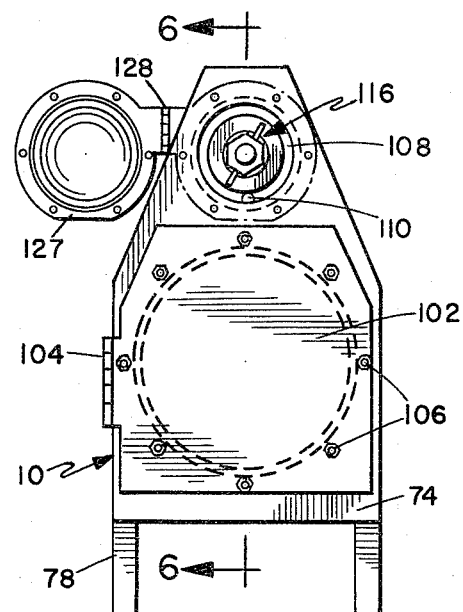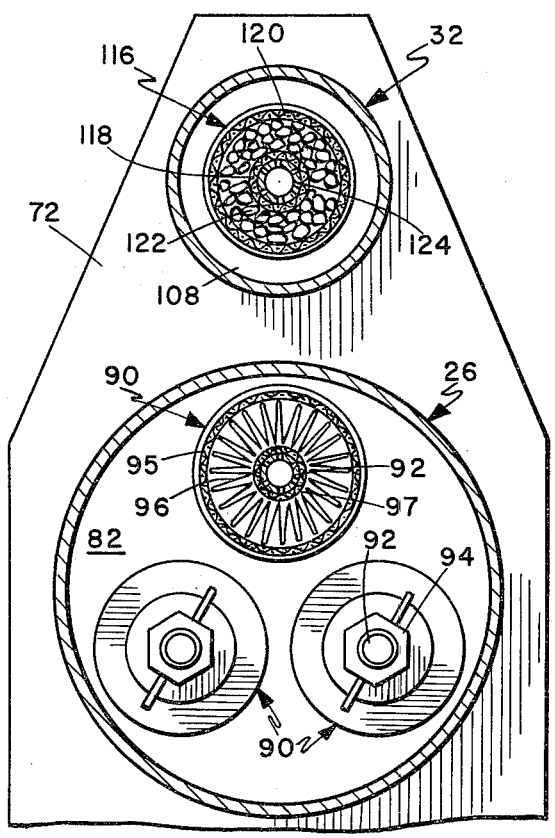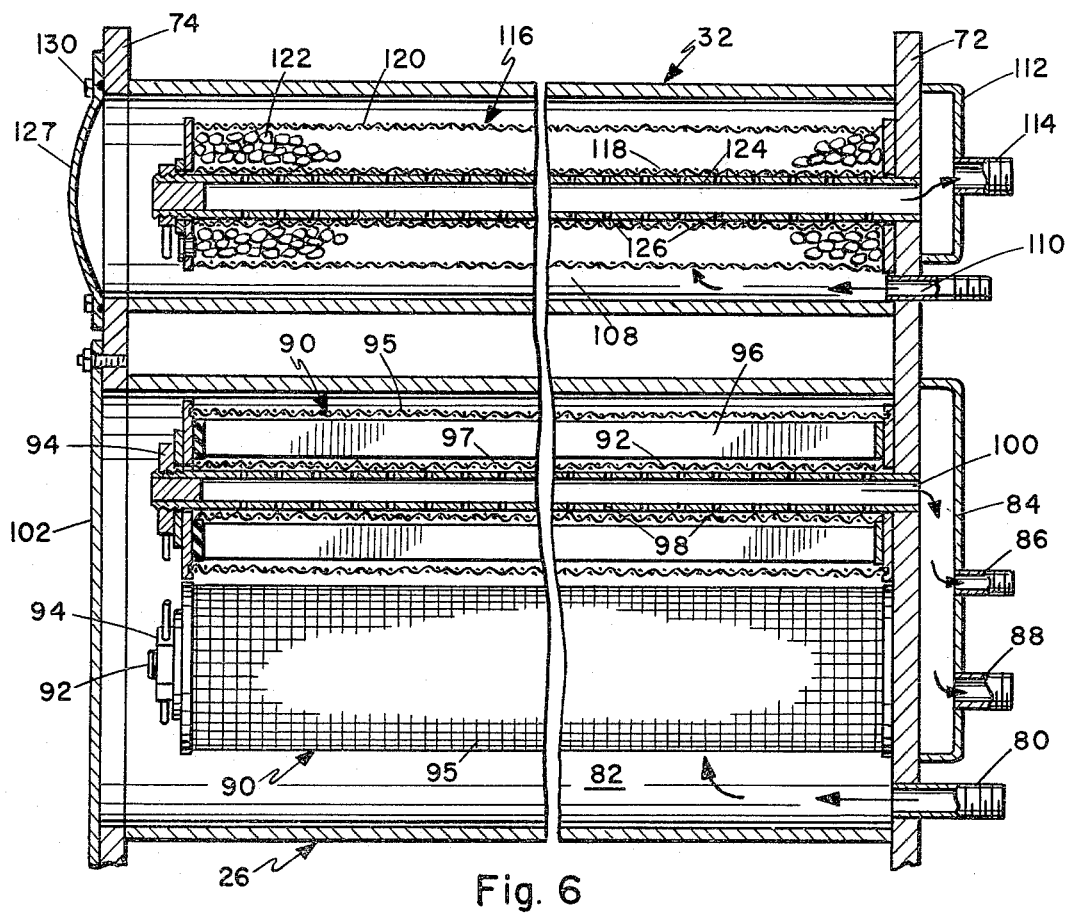

MULTIPLE BY-PASS FILTER SYSTEM

This is a continuation of application Ser. No. 921,819 filed July 17, 1978, now abandoned.

BACKGROUND OF THE INVENTION

The present invention relates to filters and pertains particularly to filter system for filtering solvents for dry cleaning establishments.

The filtering for re-use of dry cleaning fluids and solvents at dry cleaning establishments has always been a major problem. This problem stems from the many contaminants which must be filtered from and removed from the solvent. While filtering of particulate matter, such as lint and particles from the solvent, is relatively simple, the removal of other contaminants, such as non-volatile residue, fatty acids, and fugitive dyes from the solvent has always been a problem. Many prior art systems utilize distillation process for such removal.

Some clays and charcoal filters have been developed for assistance in removing contaminants from cleaning solvents. Such filters have been placed downstream of the mechanical filter which filters lint, soil and other particles from the solvent. The solvent, however, typically picks up and carries with it fine particles of the clay and charcoal into the washer unit. This fine particulate material becomes deposited on the clothes in the washer and often results in reducing the efficiency of the cleaning process. Such materials may also be redeposited on the clothing and not removed therefrom.

It is therefore desirable that a filter system be available which overcomes these and other problems of the prior art.

SUMMARY AND OBJECTS OF THE INVENTION

It is therefore the primary object of the present invention to overcome the above problems of the prior art.

Another object of the present invention is to provide an improved solvent filtering system for completely removing contaminants from solvents.

A still further object of the invention is to provide a multiple pass filter for refiltering the solvent through a mechanical filter after the adsorption filter step for removing the adsorption material as well as coating the mechanical filter with adsorption material for improved filtering.

In accordance with the primary aspect of the present invention, a multiple pass filter system is provided including a first filter unit through which fluid is passed and a second filter unit through which a portion of the fluid from the first filter unit is passed with means for recirculating the total flow from the second filter unit back through the first filter unit.

BRIEF DESCRIPTION OF THE DRAWINGS

The above and other objects and advantages of the present invention will become apparent from the following description when read in conjunction with the drawings, wherein:

FIG. 4 is an end elevational view as taken from the left end of FIG. 3.
FIG. 5 is an enlarged sectional view taken on line 5—5 of FIG. 3.
FIG. 6 is an enlarged sectional view taken on line 6—6 of FIG. 4.

DETAILED DESCRIPTION OF PREFERRED EMBODIMENTS

Figure 1:
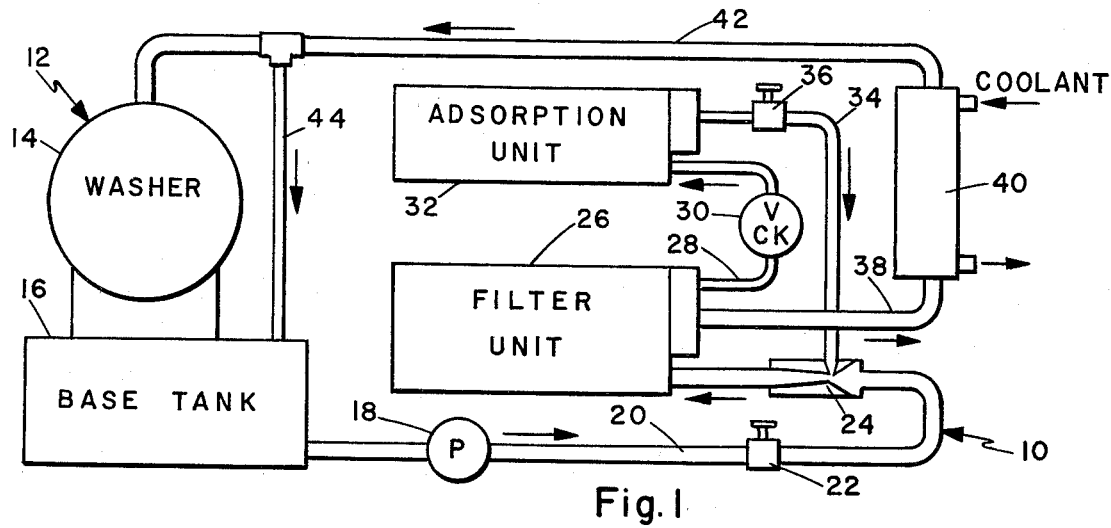
FIG. 1 is a diagram of the filter system.

Turning now to FIG. 1 of the drawings, a filter system in accordance with the invention is shown, designated generally by the numeral 10, connected to a dry cleaning washer system 12 for filtering the cleaning fluid thereof. The dry cleaning unit includes a washer 14 and a base solvent supply tank 16.

Solvent from tank 16 is taken and pumped by way of a pump 18 and conduit 20 through a flow control valve 22, a venturi or aspirator 24, into a first filter unit 26. The first filter unit is a mechanical filter, as will be described later, utilizing one or more paper cartridge type filters disposed between an inlet and outlet of the filter chamber.

The outlet from the first filter unit 26 communicates with a first conduit 28 having a check valve 30 by way of the inlet to a second filter unit 32. The second filter unit is an adsorption unit having chemical compounds, as will be described, such as clays and charcoals for adsorption of contaminants from the solvent. At least a portion of the fluid from the first filter unit is flowed through the second filter unit and then returned by way of conduit 34 having flow control means 36 therein by way of the inlet to the first filter unit. In this instance, the conduit 34 communicates with aspirator 24 for drawing the fluid from the second filter unit 32 into the inlet of the first filter unit.

The outlet of the first filter unit also includes conduit means 38 communicating with a cooler 40 and thereafter by way of a conduit 42, back to the washer 14 and by means of a branch line 44 to the base supply tank 16.

With this arrangement, fluid is filtered through the filtering system, first through the first filter unit 26 for removal of particulate matter and the like, and then at least a portion of the fluid is flowed by way of conduit 28 through the second filter unit for removal and adsorption of further contaminants, such as non-volatile residues, fatty acids, and fugitive dyes from the solvent. The fluid passing out of the adsorption unit picks up carbon particles and clay and other adsorption materials within the unit for depositing on the filter in the first unit 26. This solvent is then passed again through the first filter unit 26 which is in the preferred form a filter cartridge of paper or the like. The materials picked up in the second filter unit is deposited on the surface of the first filter unit, thus providing a combined adsorption and mechanical filter unit at the first filter unit. This can obviously be accomplished by making sure a portion of the carbon and clay particles are smaller than the filter screen openings. The fluid then passes from the first filter unit 26 wherein a portion of it is permitted to pass by way of conduit 38, cooler 40, and back to the washer and supply tank 16. A suitable heat exchange in cooler 42 is utilized to cool the fluid before returning it to the washer and supply tank 16.

The flow control valve 36 can be utilized to fully open the passage of fluid through conduit 34 and pass substantially the complete output from the first filter through the second filter unit. This is accomplished by reducing the outlet pressure from the adsorption unit, which results in an increase in flow therethrough for flushing the system. A suitable sight glass may be provided in conduit 34 for monitoring the dyes and the like in the fluid.

Figure 2:
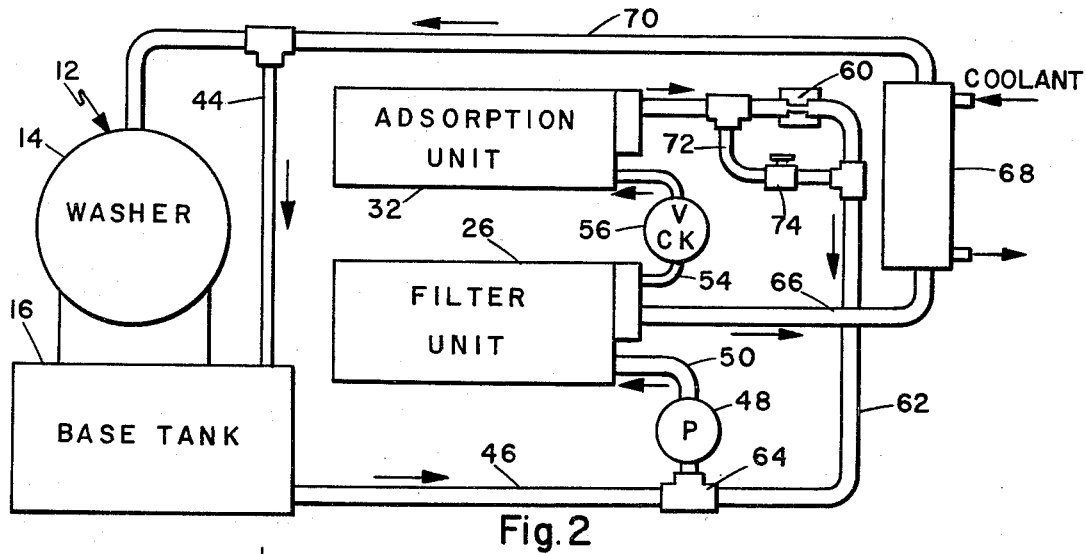
FIG. 2 is a diagram of an alternate filtration system.

Turning now to FIG. 2 of the drawing, an alternate embodiment of the filter system is shown connected to a washer or dry cleaning system as in the previous embodiment. The washer system will be identified by the same reference numerals.

As shown in FIG. 2, fluid is taken from base tank 16 by way of conduit 46 and pump 48 and introduced by conduit 50 into the inlet of filter unit 26. This unit contains one or more mechanical filters, such as paper filters and the like, and filters the fluid which then passes to the outlet thereof and a portion of which then passes by conduit 54 and check valve 56 to the inlet of the second filter unit 32. The second filter unit is an adsorption filter unit having cartridges containing chemical materials such as clays, carbon and the like for further removing contaminants from the solvent. The solvent then passes from the unit 32 by way of a restriction 60, conduit means 62, back to the inlet by way of T joint or the like 64 of the pump 48. This portion of the fluid is recirculated and clays, carbon and the like picked up by the fluid is deposited on the outer surface of the paper filter elements in the filter unit 26. This provides an additional filtering of the fluid in the first filter unit. The fluid then passes back through the filter elements in the unit 26 and a portion thereof then passes by way of conduit 66 through a cooling unit 68 back by way of conduit 70 to the inlet of the washer 14 and base tank 16. A by-pass conduit 72 and by-pass control valve 74 functions to by-pass the restriction 62 in case increased flow of the solvent through the adsorption unit 32 is required. When the line 72 and control valve 74 is fully open, a majority of the fluid from the unit 26 passes through the unit 32 back along conduit 62 to the inlet of pump 48. Preferably a sight glass or the like is provided to monitor the fluid passing from the unit 32. The by-pass unit provides for rapid recirculation of the solvent in case of emergency, such as excess dyes and the like being contained in the solvent.

The primary distinction of the FIGS. 1 and 2 embodiments is the by-pass or recirculating control portion thereof. In the FIG. 2 embodiment, the recirculation is directly into the inlet of pump 48 with the passage through a normally controlled restriction 60 with a by-pass permitted in case of the need for emergency flow.

Figure 3:
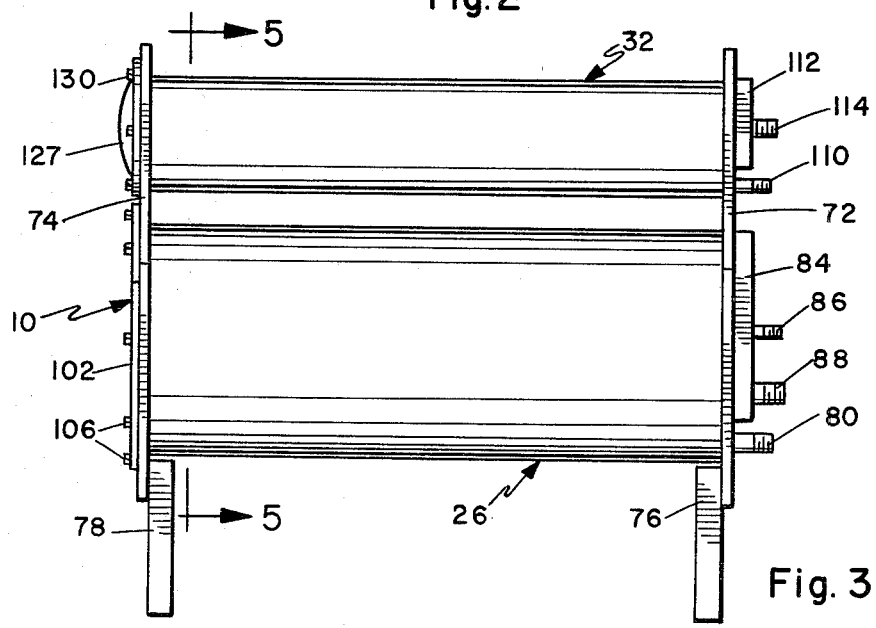
FIG. 3 is a side elevational view of the basic filtration unit.

Turning to FIG. 3 of the drawings, there is illustrated a preferred construction of the filter chambers. The filter unit will carry the basic number as in FIG. 1. Thus, the filter units 26 and 32 comprise generally cylindrical housings mounted on frame support members 72 and 74 which in turn are supported by base members 76 and 78. The lower or first filter unit 26 as best seen in FIGS. 5 and 6, includes an inlet conduit 80 communicating with an inner chamber 82 in which is mounted a plurality of filter units. The oulet from the chamber 82 is by way of a manifold 84 having an outlet 86 and an outlet 88. The outlet 86 communicates by way of conduits 28 or 54 of FIGS. 1 and 2 to the second filter unit 32. Within the chamber 82 is a plurality of filter elements as illustrated in FIG. 5 comprising three identical elements. These filter elements comprise cartridges 90, each of which is mounted on a central support conduit 92 and held in place by a removable nut 94. The filter cartridges are of a suitable design, preferably having an outer perforate shell 95 and inner perforate shell 97 of sufficient strength to support the cartridge with inner pleated filter elements or inserts 96. The support tube 92 includes a plurality of perforations 98 through which fluid enters after passing through the paper element of the filter into the support conduit 98, and passes therefrom by way of an outlet port 100 into the outlet manifold 84. Any number of the filter elements or cartridges may be utilized within a chamber. Fluid entering the chamber 82 flows into the cartridge elements from the outside, thus passing from the outside into the inside through the cartridge filter element into the center conduit 92 and therefrom into the manifold 84. The filter cartridges may be of any suitable type of paper filter element, but are preferably of the replaceable element type. Such type permits the replacement of the paper element 96 with a retention of the outer shell which may be constructed of a metal screen or perforated metal shell.

Access to the chamber 82 for replacement of the cartridges is by way of access door 102 which is hinged, for example, at 104 and fits over the end of the cylinder and is secured in place by a plurality of bolts 106.

The second filter unit of this system is similarly constructed and comprises a generally cylindrical housing having a chamber 108 with an inlet at 110 and an outlet by way of a manifold 112 having an outlet 114. The manifold is primarily for when multiple filter untis are installed within the chamber, for provision of communication to the end of a support rod or conduit thereto. In this embodiment, a single filter cartridge 116 is illustrated comprising inner and outer perforated walls 118 and 120 with a filter material 122 of a suitable adsorption quality. This material may comprise clays, charcoal particles, and the like. The cannister is supported on an elongated tubular member 124 having perforations 126 for communicating through the canister into the conduit and therefrom into the outlet of the filter element. Access to the chamber is by way of an access door 127 hinged such as at 128 to the support frame of the filter assembly. The door is secured in its closed and sealed position in a suitable manner, such as by means of bolts 130.

Thus, with this system as above described, a multiple pass filter system is provided wherein fluids such as solvents make multiple passes through the filter system for removing of contaminants therefrom. While my invention has been illustrated and described by means of specific embodiments, it is to be understood that numerous changes and modifications may be made therein without departing from the spirit and scope of the invention as defined in the appended claims.

Having described my invention, I now claim:

1. A continuous flow multiple pass filtering system for filtering dry cleaning fluid from a dry cleaning washer comprising in combination:

a mechanical filter including a chamber having an inlet and an outlet and at least one filter element between said inlet and said outlet, a pump for supplying fluid directly to the inlet of said mechanical filter, an adsorption filter including a chamber having an inlet communicating with the outlet of said mechanical filter, an outlet and at least one filter element between said inlet and said outlet, and first conduit means for diverting at least a portion of fluid from the outlet of said mechanical filter to the inlet of said adsorption filter chamber, second conduit means for communicating the outlet from said adsorption filter directly to the inlet to said pump for recirculating the fluid from the adsorption filter through the mechanical filter, and fixed restricting means in said second conduit means for maintaining a predetermined minimum flow rate through said adsorption filter by controlling the fluid flow between the outlet of said adsorption filter and the inlet to said pump.

2. The multiple pass filtering system of claim 1 wherein said adsorption filter contains adsorption clays and charcoal, and a coating on said mechanical filter comprising a portion of said clay and charcoal picked up by said fluid from said adsorption filter and deposited on said mechanical filter during recirculation through said mechanical filter for thereby defining a combined adsorption and mechanical filter at said mechanical filter.

3. The multiple pass filtering system of claim 2 wherein said mechanical filter is a replaceable cartridge paper filter.

4. The multiple pass filtering system of claim 3 wherein said mechanical filter chamber includes a plurality of individual filter elements between said inlet and said outlet.

5. The multiple pass filtering system of claim 2 including by-passing means for by-pasing said restricting means in said second conduit means to permit free flow of fluid from said adsorption filter back to said mechanical filter via said pump.

* * * * *